United States Patent
Weijkamp et al.

(10) Patent No.: US 9,834,006 B2
(45) Date of Patent: Dec. 5, 2017

(54) METHOD OF ELEVATED PRINTING

(71) Applicant: OCE-TECHNOLOGIES B.V., Venlo (NL)

(72) Inventors: Clemens Weijkamp, Venlo (NL); Cédric Valade, Venlo (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 15/171,432

(22) Filed: Jun. 2, 2016

(65) Prior Publication Data
US 2016/0361929 A1    Dec. 15, 2016

(30) Foreign Application Priority Data
Jun. 10, 2015  (EP) ................... 15171449

(51) Int. Cl.
  *B41J 2/015*  (2006.01)
  *B41J 2/21*  (2006.01)
  *B29C 67/00*  (2017.01)
  *B33Y 10/00*  (2015.01)
  *B41J 2/14*  (2006.01)

(52) U.S. Cl.
  CPC .......... *B41J 2/21* (2013.01); *B29C 67/0059* (2013.01); *B33Y 10/00* (2014.12); *B41J 2/14* (2013.01)

(58) Field of Classification Search
None
See application file for complete search history.

(56) References Cited

U.S. PATENT DOCUMENTS

| 2002/0167101 | A1* | 11/2002 | Tochimoto | B29C 41/36 264/40.1 |
| 2005/0046684 | A1  | 3/2005  | Yoneyama  | |
| 2008/0211866 | A1* | 9/2008  | Hill      | B41M 3/008 347/42 |
| 2010/0195122 | A1  | 8/2010  | Kritchman | |

* cited by examiner

*Primary Examiner* — Matthew Luu
*Assistant Examiner* — Tracey McMillion
(74) *Attorney, Agent, or Firm* — Birch, Stewart, Kolasch & Birch, LLP

(57) ABSTRACT

A method of forming a solid body using a two-dimensional image printer, wherein liquid droplets of different colors are used for applying solid material in several layers one upon the other, and colors of the liquids for forming a surface layer of the body are selected from a specific set of surface colors, the surface layer being formed by mixed printing of transparent droplets and surface color droplets, characterized in that the thickness of the surface layer is varied such that it increases with increasing slope of the surface of the body.

8 Claims, 1 Drawing Sheet

METHOD OF ELEVATED PRINTING

BACKGROUND OF THE INVENTION

1. Field of the Invention

The invention relates to a method of forming a solid body using a two-dimensional image printer, wherein curable liquids of different colors are used for printing and curing droplets in several layers one upon the other, and colors of the liquids for forming a surface layer of the body are selected from a specific set of surface colors.

2. Description of the Related Art

Methods are known for elevated printing or 3D printing using a two-dimensional image printer. For a relatively flat body, this is also known as relief printing, or 2.5D printing. The two-dimensional image printer may, for example, be an ink jet printer, using UV-curable inks as the liquids which, after printing and curing with UV-radiation, will form the solid body. Alternatively, an image printer may apply phase-change inks, that are liquid at an elevated temperature and solidify by cooling down.

When a body is intended to have a specific color or color pattern on its surface, it is sufficient to use the corresponding surface colors only for printing a surface layer of the body, whereas inks in other colors may be used for forming the interior of the body. This permits to increase the efficiency of the elevated printing process. For example, when the printer has a plurality of print heads for different colors, all print heads may be used simultaneously for quickly printing the bulk of the body, whereas the surface layer is printed only with the print heads that contain the liquids in the appropriate surface colors. Moreover, when the ink used for the interior of the body is different from the ink used for the surface, it is possible to save costs by using cheaper inks for the interior of the body and/or to improve the physical properties of the body by selecting inks with appropriate properties for the interior of the body.

In patent application US2002/0167101 an apparatus is disclosed wherein a first material is used in molding the interior of a layer of a 3D molded product and a second material is jetted in molding a surface of the layer. The second material includes a plurality of resins having different color components. The first material may be an uncolored resin as the interior material is invisible to the outside.

In patent application US2005/0046684 photo-curable transparent ink droplets are applied in addition to photo-curable color ink droplets in order to be able to apply a uniform total amount of ink on a recording medium in various structures.

The color impression of the surface layer will depend not only on the selected inks but also on the thickness of this layer, because the light will penetrate to a certain depth into the interior of the body before it is reflected, so that the absorption of the material closely underneath the surface will also influence the spectrum of the reflected light. For example, when white ink is used for forming a white primer layer near the surface of the body, and a surface color is used for printing a surface layer on the white background, this color will appear bright and brilliant when the surface layer is thin, and it will appear darker and become more saturated when the thickness of the surface layer is increased.

The printer applies the ink droplets by jetting them in a certain jetting direction onto the substrate on which the body is to be formed and onto ink layers that have been formed already, respectively. For the purposes of this disclosure, the jetting direction shall be assumed to be the vertical direction.

When the droplets are jetted out in the liquid state and impinge on the substrate or a lower layer of the body, the ink will spread to some extent in the direction normal to the jetting direction before it is cured. Consequently, each droplet will form, after curing, a lens-shaped ink dot with a relatively large diameter, e.g. 60 μm (corresponding to the size of one pixel in conventional two-dimensional printing) in the directions normal to the jetting direction, whereas the dimension in the jetting direction is significantly smaller (e.g. 1-10 μm). Consequently, when the surface layer is formed by only a single layer of droplets, the thickness will be small at the top surface, where the surface layer is flat and extends essentially at right angles to the jetting direction, whereas the thickness of the surface layer will be significantly larger (in the order of magnitude of the above-mentioned relatively large diameter) in surface regions where the surface the body forms a steep slope or extends even vertically. As a consequence, the color impression will not be as uniform as desired.

Moreover, when the thickness of the surface layer corresponds to only a single droplet in essentially vertical surface regions, the "pile" of cured droplets that form the surface layer may become instable and irregular, due to inevitable variations in the positions at which the droplets are deposited. This effect may lead to a rough and non-uniform appearance of the surface.

It is an object of the invention to improve the surface quality of a body formed by elevated printing, in particular the surface color quality.

SUMMARY OF THE INVENTION

According to the invention, in order to achieve this object, the surface layer is formed by mixed printing of transparent droplets and surface color droplets, wherein the thickness of the surface layer is varied dependent upon the slope of the surface such that the thickness of the surface layer is large where the slope is steep and small where the slope is small or zero.

The use of transparent droplets, i.e. droplets of a transparent curable or otherwise solidifying liquid in the surface layer permits to control the thickness of the surface layer without substantially affecting the color impression of the surface layer. Thus, for example, the thickness of the surface layer may be increased to two or more droplets in steep surface areas in order to improve the stability of the surface layer, but the color impression will hardly change because the transparent droplets do not substantially contribute to the absorption of light. Furthermore, the stability of the surface layer is enhanced by a larger probability that the colorants intended to contribute to the surface layer are jetted on a position associated with the surface layer due to a better profile of the surface layer in the jetting direction, thereby dimming alignment faults.

More specific optional features of the invention are indicated in the dependent claims.

Preferably, the ratio between transparent droplets and surface color droplets is varied in dependence on the thickness of the surface layer, so that the density of colored droplets (number of droplets in a surface color divided by the total number of droplets in a given volume of the surface layer) decreases with increasing thickness of the surface layer.

In a preferred embodiment, a primer layer of white material is applied underneath a surface layer, comprising a layer of colored material sandwiched between two layers of transparent material. This ensures a good separation between the white and color material, while maintaining the color stability as a function of the slope of the surface of the object.

BRIEF DESCRIPTION OF THE DRAWINGS

Embodiment examples will now described in conjunction of the drawings, wherein.

DETAILED DESCRIPTION OF EMBODIMENTS

Figure 1:
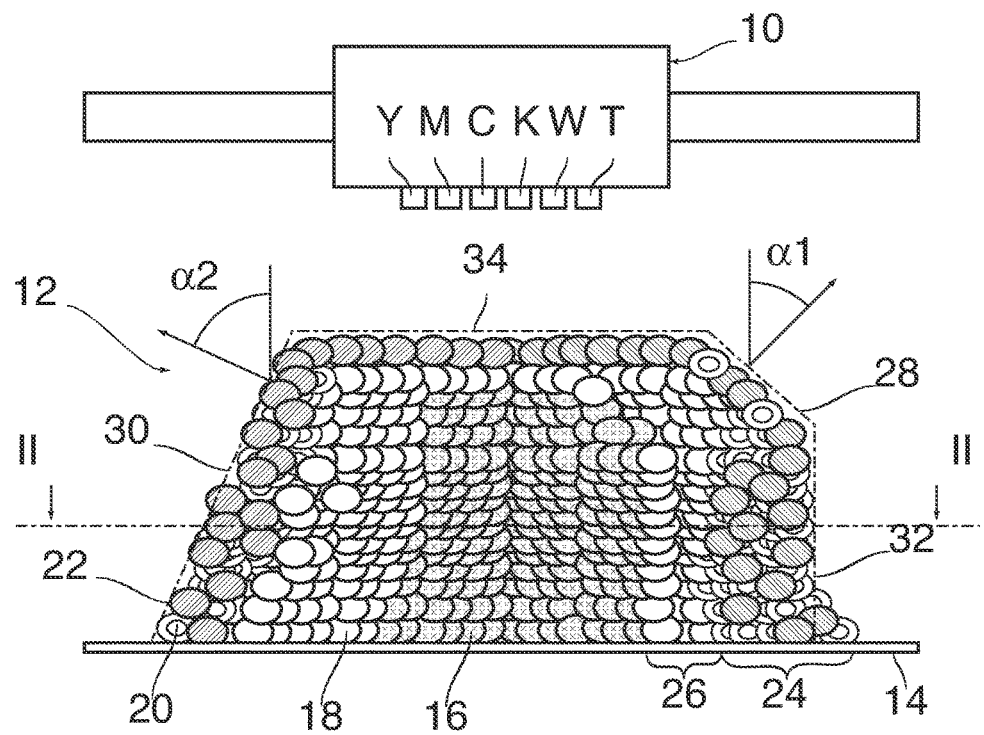
FIG. 1 is a schematic sectional view of a body formed by printing with an ink jet printer.

The present invention will now be described with reference to the accompanying drawings, wherein the same or similar elements are identified with the same reference numeral. Embodiments of the invention have been worked out on a printer applying UV-curable, colored ink, but printers applying liquids solidifying in other ways are equally suitable.

As is shown in FIG. 1, a reciprocating print head assembly 10 of an ink jet printer has been used for forming a three-dimensional solid body 12 on a surface of a flat substrate 14. The body 12 is formed by droplets 16, 18, 20 and 22 of cured ink (e.g. UV curable ink) that have been jetted out from print heads Y, M, C, K, W, and T of the print head assembly 10 vertically downward onto the substrate 14 in several layers superposed one upon the other. The droplets are lens-shaped in vertical cross-section, as in FIG. 1, because the liquid tends to spread in horizontal direction, i.e. normal to the jetting direction, before the liquid ink solidifies in the curing process.

In the example shown, the body 12 is intended to have a uniform color. However, this color is determined only by the droplets 22 in a surface layer 24 of the body. The color of the ink forming the droplets 22 is selected from a specific set of surface colors. For example, when the inks available in the print head assembly 10 are inks in the standard colors yellow (Y), magenta (M), cyan (Y), and black (K), and the color of the body 12 is intended to be magenta, then the set of surface colors will consist only of the color magenta. On the other hand, when the intended color of the body 12 is red, for example, then the set of surface colors will comprise yellow and magenta and the droplets 22 will be a suitable mixture of droplets in these colors. Of course, different surface colors may be specified for different surface areas of the body 12, so that a certain color pattern may be formed on the surface of the body.

The droplets 16 in the interior of the body 12 may be of any of the available colors, because their color does not matter for the outer appearance of the body. Therefore, in order to build-up the body 12 as quickly as possible, the print heads Y, M, C and K may be operated simultaneously for forming the droplets 16.

In the example shown, the print head assembly 10 has another print head W printing with white ink for forming the droplets 18 which constitute a primer layer 26 immediately underneath the surface layer 24.

According to the invention, yet another print head T for transparent, colorless ink is provided for forming the droplets 20 in the surface layer 24. Thus, the surface layer 24 contains a mixture of transparent droplets 20 and surface color droplets 22.

In the example shown in FIG. 1, the surface of the body 12 has a first sloping portion 28 having a slope m=1, corresponding to a zenith angle $\alpha_1=45°$ (the zenith angle is defined between the vertical and a normal on the surface of the body). On the opposite side, the surface has a second sloping portion with the slope m=2 and a zenith angle $\alpha_2=63.4°$. Another surface portion 32 adjoining the first sloping portion 28 on the right side in FIG. 1 extends vertically, i.e. has an infinite slope and a zenith angle of 90°, and a top surface portion 34 extends horizontally, i.e. it has the slope 0 and a zenith angle of 0°.

In the horizontal surface portion 34, the surface layer 24 is constituted by only a single layer of surface color droplets 22. In the vertical surface portion 32, the surface layer 24 has a thickness of about four droplets, measured in the direction along the normal to the surface portion 32, and this layer is constituted by more than 75% of transparent droplets 20 and less than 25% of surface color droplets 22 evenly distributed therein. This permits the surface layer 24 in the portion 32 to be built-up stably and to obtain a color impression that is equal to the color impression of the top surface portion 34. Furthermore, alignment faults between the individual drops become practically invisible because the surface color droplets 22 are supported by the transparent droplets 20.

In the first sloping portion 28, the surface layer 24 has a thickness of only one droplet. In the drawings, the droplets have been shown with a ratio of diameter to height in the order of magnitude of 3:2, in order for the individual droplets to be clearly visible. In practice, however, this ratio will be significantly larger, e.g. 10:1 or more. Consequently, the thickness of the surface layer 24 in the first sloping surface portion 28 will be larger than the thickness of the surface layer 24 in the horizontal surface portion 24. For a given zenith angle $\alpha$ and a droplet diameter d, the absolute thickness of the surface layer that is constituted by a single layer of droplets will approximately be $$d \sin(\alpha)$$

(if the height of the droplets is neglected). Therefore, in order to obtain approximately the same optical density in the horizontal surface portion 24 and the sloping portion 28, a certain number of transparent droplets 20 are included in the surface layer of the sloping portion 28, so that the average density of pigment per unit surface area is the same for the sloping surface portion 28 and the horizontal surface portion 34. This rule applies also when the surface layer is constituted by more than one droplet, as in the vertical surface portion 32.

In the second sloping portion 30 in FIG. 1, the surface layer 24 has a thickness of approximately two droplets and the content of surface color droplets 22 is larger than in the vertical surface portion 32 but still smaller than in the first sloping portion 28.

Figure 2:
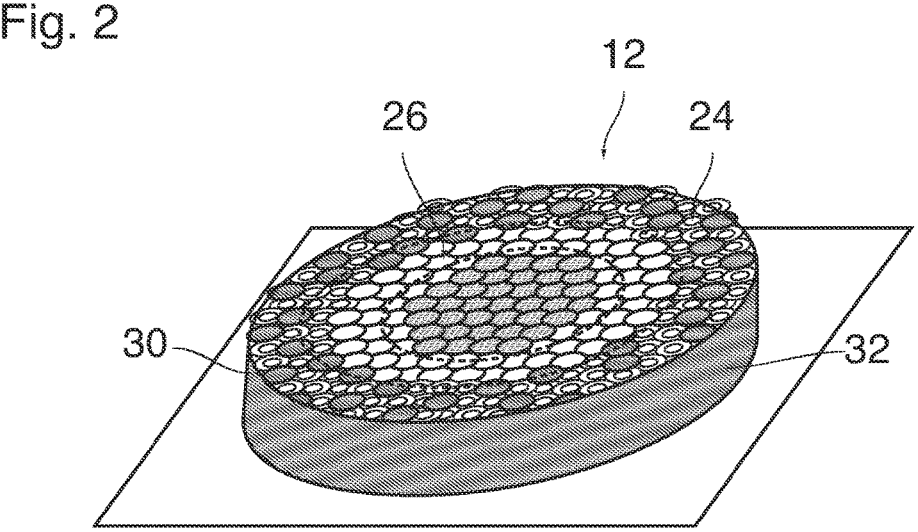
FIG. 2 is a perspective view of the body shown in FIG. 1, cross-sectioned at the plane II-II in FIG. 1.

As is shown in FIG. 2, the droplets 16 in the interior of the body 12, i.e., the droplets with arbitrary colors, constitute a core that is surrounded by the primer layer 26 of white droplets on its entire periphery, and the primer layer is covered by the surface layer 24 on the entire periphery.

It will be understood that the thickness of the surface layer 24 does not have to be an integral multiple of the diameter d of an individual droplet. Even when the print heads are only capable of printing droplets with an uniform size, the two dimensional distribution of the droplets may be such that the average thickness of the surface layer 24 can assume any desired value.

The invention being thus described, it will be obvious that the same may be varied in many ways. Such variations are not to be regarded as a departure from the scope of the invention, and all such modifications as would be obvious to one skilled in the art are intended to be included within the scope of the following claims.

What is claimed is:

1. A method of forming a solid body using a two-dimensional image printer, comprising:
applying materials of different colors in liquid droplets for solidifying in several layers one upon the other to form a body having an interior and surface layer, and selecting colors of the liquids for forming the surface layer of the body from a specific set of surface colors, the surface layer being formed by mixed printing of transparent droplets and surface color droplets,
wherein a thickness of the surface layer in a direction normal to the surface layer increases with increasing slope of the surface layer of the body.

2. The method according to claim 1, further comprising curing the liquid droplets after application by UV-radiation.

3. The method according to claim 1, wherein the surface layer, at least in selected surface portions of the body, comprises droplets that are arranged in several layers superposed in the direction of the normal to the surface layer.

4. The method according to claim 3, wherein the surface layer comprises a layer of colored material sandwiched between two layers of transparent material.

5. The method according to claim 1, wherein the number of droplet layers constituting the surface layer is varies with the slope of the surface layer.

6. The method according to claim 1, wherein the ratio between transparent droplets and surface color droplets varies with the thickness of the surface layer.

7. The method according to claim 1, further comprising forming a primer layer of droplets that have a uniform color immediately underneath the surface layer.

8. The method according to claim 7, wherein the primer layer comprises predominately white material.

* * * * *